(12) United States Patent
Peterson et al.

(10) Patent No.: US 11,007,391 B1
(45) Date of Patent: May 18, 2021

(54) METAL ORGANIC FRAMEWORK POLYMER COMPOSITES

(71) Applicant: U.S. Army Edgewood Chemical Biological Center, Apg, MD (US)

(72) Inventors: Gregory W Peterson, Belcamp, MD (US); Xi Lu, Abingdon, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 663 days.

(21) Appl. No.: 15/916,776

(22) Filed: Mar. 9, 2018

(51) Int. Cl.
| | |
|---|---|
| *A62D 3/33* | (2007.01) |
| *C08F 236/06* | (2006.01) |
| *C07F 19/00* | (2006.01) |
| *C08K 3/22* | (2006.01) |
| *C08L 9/06* | (2006.01) |
| *A62D 101/02* | (2007.01) |
| *A62D 101/28* | (2007.01) |
| *A62D 101/26* | (2007.01) |
| *A62D 101/22* | (2007.01) |
| *G01J 3/10* | (2006.01) |

(52) U.S. Cl.
CPC .............. *A62D 3/33* (2013.01); *C07F 19/005* (2013.01); *C08F 236/06* (2013.01); *C08K 3/22* (2013.01); *C08L 9/06* (2013.01); *A62D 2101/02* (2013.01); *A62D 2101/22* (2013.01); *A62D 2101/26* (2013.01); *A62D 2101/28* (2013.01); *C01P 2002/82* (2013.01); *C01P 2002/85* (2013.01); *C01P 2004/03* (2013.01); *C08F 2800/20* (2013.01); *C08K 2003/2244* (2013.01); *G01J 3/10* (2013.01)

(58) Field of Classification Search
CPC ................. A62D 3/33; A62D 2101/02; A62D 2101/22; A62D 2101/26; A62D 2101/28; C07F 19/005; C08F 236/06; C08F 2800/20; C08K 3/22; C08K 2003/2244; C08L 9/06; C01P 2002/82; C01P 2101/22; C01P 2101/26; C01P 2101/28; G01J 3/10
USPC ........................................................ 588/315
See application file for complete search history.

(56) References Cited

U.S. PATENT DOCUMENTS

| | | | |
|---|---|---|---|
| 2010/0222619 A1* | 9/2010 | Koh ........................... | C07C 5/42 585/250 |
| 2013/0112613 A1* | 5/2013 | Kang ................... | B01D 67/003 210/500.21 |
| 2016/0361702 A1* | 12/2016 | Cohen ..................... | B01D 53/02 |
| 2018/0003604 A1* | 1/2018 | Shiba ..................... | G01N 21/49 |
| 2018/0065105 A1* | 3/2018 | Song ...................... | B01J 20/305 |

* cited by examiner

*Primary Examiner* — Edward M Johnson
(74) *Attorney, Agent, or Firm* — Ulysses John Biffoni

(57) ABSTRACT

Provided are composite materials that include a polymeric material and one or more metal organic frameworks intermixed with the polymeric material. A polymeric material may be a block copolymer that is optionally polymerized prior to combination with the metal organic framework. The composite materials are useful for many applications including as sorbents for removal of a chemical, optionally a toxic chemical, from a surface where the surface is contracted with the composite material which reacts with or adsorbs the chemical and is then removed to remove the chemical from the surface.

30 Claims, 13 Drawing Sheets

METAL ORGANIC FRAMEWORK POLYMER COMPOSITES

U.S. GOVERNMENT INTEREST

The invention described herein may be manufactured, used and licensed by or for the U.S. Government.

FIELD

This invention generally relates to porous sorbents, specifically metal-organic frameworks (herein referred to as MOFs), associated with polymeric materials.

BACKGROUND

Metal organic frameworks (MOFs) are a class of materials comprised of secondary building units (SBU), typically made from metal oxide clusters, connected by organic linkers. The resulting structures are an extended, 3-dimensional framework that is often highly porous. Due to the ability to change/tune both the SBU (e.g., changing metal type) and organic linker (e.g., putting functional groups on the linker, using larger/bulkier/longer linkers), an incredible range of structures is possible.

There are multiple sub-groups of MOFs, such as isoreticular MOFs (IRMOFs), UiO-MOFs, MIL MOFs, zeolitic imidazolate frameworks (ZIFs), among others. Typically these groups are based on structural similarities of the MOFs. For example, most of the IRMOFs contain zinc acetate SBUs, and changing the linker results in a wide range of porous structures. IRMOFs in particular are not stable to water, however.

UiO-66-type MOFs are structures originally synthesized at the University of Oslo. Comprised of zirconium based SBUs, this series of MOFs is particularly stable to water as well as acidic conditions. UiO-66 utilizes a terephthalic acid (aka benzene dicarboxylate) linker that can be functionalized with a variety of groups, such as an amine (aka amino) group (herein known as UiO-66-$NH_2$).

Provided herein are new ways of utilizing MOFs as personal protection such as in filtration media or membranes or for detoxifying or decontaminating a surface or fluid including a chemical warfare agent, simulant, other toxic chemical, or other hazardous chemicals such as explosives.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

The present disclosure is directed to composite materials containing a MOF or a combination of MOFs dispersed or otherwise intermixed within in a polymeric material, optionally a block copolymer, optionally a prepolymerized block copolymer. A block copolymer is optionally polystyrene-lock-polyisoprene-block-polystyrene; however, other block copolymers or combinations thereof can be used. A MOF is optionally present at a weight percent of 5-35 wt %, optionally 5 to 20 wt %.

Illustrative examples of a MOFs used in a composite material include UiO, IRMOF, MIL, or PCN. While any MOF may be used in combination with a polymer, particular examples include UiO-66-$NH_2$, HKUST-1, PCN-250, ZIF-8, UiO-66, UiO-67, NU-1000, MOF-545, $Zn_2(bpdc)_2(bpee)$, MIL-53-$NH_2$, MIL-125-$NH_2$, ZIF-8, MOF-74 (M-DOBDC), PCN-222, and combinations thereof. Optionally, the functional material is a metal organic framework that includes at least one pendant group in the framework, the pendant group comprising an amine, nitro, or halide. A MOF includes one or more metals, wherein the metal is optionally selected from the group consisting of: Al; Si; Cr; Fe; Co; Ni; Cu; Zn; Hf; Mn; Ti; V; Zr; Ca; Mg; and the lanthanides.

In some aspects, a composite material further includes one or more second reactive compounds, optionally a metal oxide, zeolite, or metal nanoparticle. When a second reactive compound is a metal oxide, the metal oxide optionally is a transition metal. In some aspects, a metal oxide or metal nanoparticle includes a metal selected from the group of Al; Si, Cr, Fe; Co; Ni; Cu; Zn; Hf; Mn; Ti; V; Zr; Ca; Mg; a lanthanide; and combinations thereof.

Also provided are processes of removing a chemical from a surface including contacting the composite material as provided herein with a surface for a contact time, and removing the composite material from the surface to thereby remove the chemical from the surface. A chemical is optionally a toxic chemical. A toxic chemical removed by the process is optionally 2-chloroethyl ethyl sulfide, ammonia, ammonia nitrate, an organophosphate, cyclotrimethylenetrinitramine, pentaerythritol tetranitrate, octogen trinitrotoluene, 2,4-dinitrotoluene, 2,6-dinitrotoluene; arsine, chlorine, cyanogen chloride, hydrogen chloride, hydrogen cyanide, hydrogen sulfide, methyl bromide, nitrogen dioxide, phosgene, sulfur dioxide, bis-(2-chloroethyl)sulfide (HD or mustard gas), G-type nerve agents such as pinacolyl methylphosphonofluoridate (GD), Tabun (GA), Sarin (GB), cyclosarin (GF), and V-type nerve agents such as O-ethyl S-(2-diisopropylamino)ethyl methylphosphonothioate (VX), or combinations thereof.

Also provided are processes of detecting the presence or absence of a toxic chemical including, contacting a sample containing a toxic chemical with a composite material as provided herein for a detection time; and detecting the presence or absence of a toxic chemical in the sample by a colorimetric change in the composite material.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

FIG. 1I illustrates activity of UiO-66-NH$_2$ toward methyl paraoxon;

DETAILED DESCRIPTION

Figure 1:
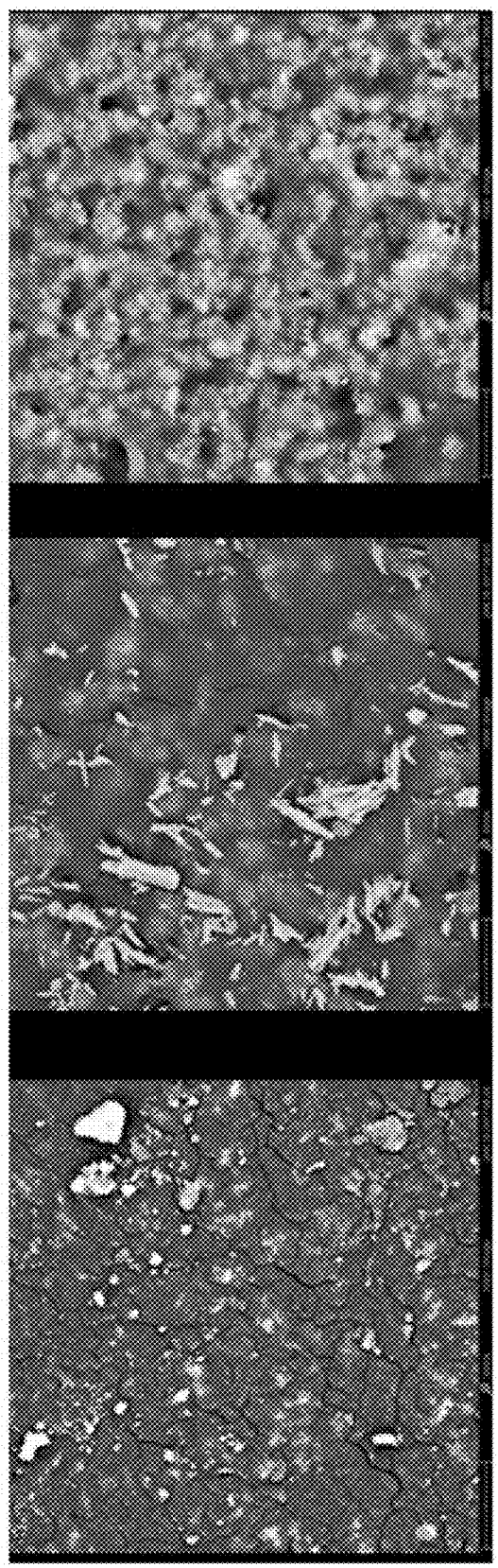
FIG. 1 presents SEM images of UiO-66-$NH_2$ with block copolymer (BCP) at 10 weight percent (A), 25 weight percent (B) and 50 weight percent (C) illustrating compatibility between the BCP and the MOF.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided herein are composite materials that combine a block copolymer with one or more metal organic frameworks (MOF). It was found that by combining these two materials a stretchable and robust system can be formed with functionality toward toxic chemicals that allow for new systems to decontaminate surfaces or fluids (e.g., air) and may be used as a filtration system, or as a portion of or entirety of personal protective equipment.

A composite material as provided herein includes a MOF in combination with a polymer to form a mixed matrix membrane (MMM). Polymers are a robust group of materials that come in a variety of forms with a commensurate variety of properties. Some polymers are hard and brittle, while others are viscoelastic. Some can be combined to form block copolymers (BCP), which can lead to new properties. In some cases, block copolymers allow for structural stability while also having stretchable properties. As such, in some aspects a polymer as used in a composite material is a block copolymer. Although any block copolymer may be used, one particular example of a block copolymer is polystyrene-block-polyisoprene-block-polystyrene (PS-b-PI-b-PS). PS-b-PI-b-PS is a thermoplastic elastomer used in other systems such as hot melt adhesives, molded and extruded parts, footwear, and other areas. The structure of PS-b-PI-b-PS is shown in Formula I:

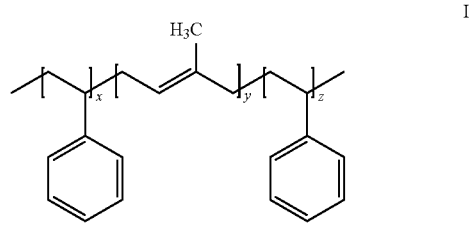

where x is polystyrene, y is polyisoprene, and z is polystyrene. Optionally, y is a predominant on a unit value basis, optionally the unit percentage of y is twice or more the value of x and z alone or combined, optionally three times or more the value of x and z alone or combined.

Other examples of copolymers include block copolymers of a vinylaromatic monomer with one or more dienes. Additional specific examples are copolymers of styrene and a butadiene such as 1,3-butadiene, or styrene and methyl methacrylate (MMA). Other illustrative examples include a copolymer of isobutylene and isoprene (butyl rubber), a copolymer of butadiene and acrylonitrile (nitrile), among others. Specific examples include, but are not limited to poly(styrene-ethylene/propylene-styrene) (SEPS), styrene-butadiene rubber (SBR), or poly(styrene-butadiene-styrene) (SBS). Illustrative examples of suitable copolymers may be found in U.S. Pat. No. 6,369,160.

A material as provided herein includes one or more MOFs. MOFs are reticular porous structures formed through the bonding (covalent or otherwise) of metal oxide (or other) secondary building units (SBUs) and organic linkers. Both the SBU and organic linker can be tuned by changing metal type, functional group, and size, resulting in a wide potential range of frameworks with varying functionality and porosity (surface area, pore volume, pore aperture). UiO-66-NH$_2$ is one of many MOFs used in the materials and processes provided herein. Specifically, the electron donating functional group in UiO-66-NH$_2$ interacts with structures containing nitro groups, and is therefore of particular interest for explosives detection/removal. Since the surface area (1182 m$^2$/g) of UiO-66-NH$_2$ is high, there is a greater amount of reactivity with chemicals containing nitro groups.

The materials as provided herein are optionally not limited to the inclusion of UiO-66-NH$_2$. Due to the ability to change/tune both the SBU (e.g., changing metal type) and organic linker (e.g. putting functional groups on the linker, using larger/bulkier/longer linkers), the formation of several type of MOF structures is possible. There are multiple sub-groups of MOFs, such as isoreticular MOFs (IRMOFs), materials from institute Lavoisier (MIL) MOFs, zeolitic imidazolate frameworks (ZIFs), and others. Typically these groups are based on similarities of the structures. For example, most of the IRMOFs contain zinc acetate SBUs, and changing the linker results in a wide range of porous structures. UiO-66, as one example, utilizes a terephthalic acid (aka benzene dicarboxylate) linker that can be functionalized with a variety of groups, such as an amine group (herein known as UiO-66-NH$_2$). MIL MOFs, although typically utilizing different metals such as iron, chromium, and aluminum, can also be functionalized with amine groups. As such, a MOF may optionally comprise an amine containing MOF whereby the amine is present in the MOF as a functional group capable of reacting with a chemical.

Optionally, a MOF is a UiO-66 analog such as UiO-66-NH$_2$. UiO-66 MOFs are formed of Zr$_6$O$_4$(OH)$_4$ octahedra that are 12-fold connected to adjacent octahedra through a 1,4-benzene-dicarboxylate (BDC) linker, resulting in a highly packed fcc structure. Methods of forming such MOFs including amine-containing MOFs are illustratively presented in *J. Am. Chem. Soc.*, 130, 13850 (2008), *Chem. Commun.*, 46, 7700 (2010), and U.S. Pat. No. 9,175,025 B2. In some aspects, an MOF is a Zn(DABCO) MOF or PCN-250. These and other operable MOFs as well as illustrative methods of synthesis of such MOFs may be found in Stock and Biswas, *Chem. Rev.*, 2012; 112 (2):933-969 and Feng, D. et al., *Nat. Commun.* 5:5723 doi: 10.1038/ncomms6723 (2014).

Other MOFs may be used as well as long as the MOF is capable of sorbing, optionally absorbing a chemical. Other illustrative examples of MOFs include but are not limited to HKUST-1, NU-1000, UiO-66, UiO-66-NH$_2$, UiO-66 analogs; UiO-67, Zn$_2$(bpdc)$_2$(bpee), PCN-250, MIL-53-NH$_2$, MIL-125-NH$_2$, ZIF-8, PCN-250, MOF-74 (M-DOBDC), PCN-222, and any combination thereof.

A MOF includes a metal. A metal is optionally: Al; Si; Cr; Fe; Co; Ni; Cu; Zn; Hf; Mn; Ti; V; Zr; Ca; Mg; or a lanthanide. Optionally, a metal is selected from the group consisting of Al, Cr, Fe, Hf, Mn, Ti, V, Zr, Ca and Mg. In some aspects, a metal is Zr or Ti. Optionally, a metal is Zr.

A MOF is optionally substantially pure. The term "substantially pure" is meant free of additional contaminating metals, salts, acids, or other materials that may detract from the effectiveness of the resulting porous MOF. Substantially pure optionally means 90% pure, optionally 91% pure, optionally 92% pure, optionally 93% pure, optionally 94% pure, optionally 95% pure, optionally 96% pure, optionally 97% pure, optionally 98% pure, optionally 99% pure, optionally 99.1% pure, optionally 99.2% pure, optionally 99.3% pure, optionally 99.4% pure, optionally 99.5% pure, optionally 99.6% pure, optionally 99.7% pure, optionally 99.8% pure, optionally 99.9% pure, or of greater purity.

A MOF has a porous structure. Pore volume (optionally average pore volume) of a MOF is optionally at or greater than 0.1 cubic centimeters per gram (cm$^3$/g), optionally at or greater than 0.3 cm$^3$/g. In some aspects, pore volume is 0.1 cm$^3$/g to 1.2 cm$^3$/g, or any value or range therebetween, optionally 0.3 cm$^3$/g to 1.2 cm$^3$/g, optionally 0.1 cm$^3$/g to 0.9 cm$^3$/g, optionally 0.3 cm$^3$/g to 0.9 cm$^3$/g.

A MOF has a surface area. Surface areas of exemplary MOFs as measured using the Brunauer Emmett Teller (BET) technique are optionally in excess of 600 square meters per gram (m$^2$/g). In some aspects, a surface area is at or in excess of 700 m$^2$/g, optionally 800 m$^2$/g, optionally 900 m$^2$/g, optionally 1000 m$^2$/g, optionally 1100 m$^2$/g, optionally 1200 m$^2$/g, optionally 1300 m$^2$/g, optionally 1400 m$^2$/g, optionally 1500 m$^2$/g, optionally 2000 m$^2$/g, optionally 3000 m$^2$/g, optionally 4000 m$^2$/g, optionally 5000 m$^2$/g. In some aspects, the BET surface area of a MOF is between 800 m$^2$/g and 1100 m$^2$/g.

In the processes as provided herein, a MOF contacts a polymer directly or via a linker. Optionally, the MOF is dispersed in the polymer. A MOF may be present in a polymer from 0.1 to 99.9 weight percent or any value or range therebetween. Optionally, the MOF is present in the polymer from 1 to 99 weight percent, optionally 1 to 80 weight percent, optionally 10 to 75 weight percent, optionally 5 to 35 weight percent, optionally 5 to 20 weight percent. Optionally, an MOF is present from 1 to 30 weight percent, optionally 5 to 30 weight percent, optionally 5 to 40 weight percent, optionally 5 to 50 weight percent. The amount of MOF relative to polymer will alter the properties of the resulting material relative to the absence of an MOF. For example at less than 50 weight percent MOF the elasticity of the polymer is typically not appreciably altered. As weight percent MOF increase, the elasticity is reduced making the material more difficult to stretch.

A material has a particular elasticity as characterized by the modulus of elasticity of the material. The modulus of elasticity, yield stress, breaking stress, yield elongation and elongation at break or a material may be determined in the tensile test in accordance with ISO 527.

A material as provided herein includes at least one MOF. A material optionally includes 2 or more MOFs. A material optionally includes 2, 3, 4, 5, 6, or more MOFs. Due to the porous nature of MOFs, these materials are able to adsorb chemicals thereby localizing and optionally concentrating the chemical from a sample. Furthermore, the reactive groups on MOFs are able to interact with explosives and explosive simulants. The MOF are suitable for incorporation into polymeric materials.

A material optionally includes one or more second reactive compounds. A second reactive compound is optionally a metal oxide, zeolite, or metal nanoparticle. Metal oxides (MOs) are ceramic materials composed of cations coordinated with oxygen ligands. For the purposes of this disclosure, MOs consist of crystalline materials as well as amorphous materials; therefore including hydroxides and oxyhydroxides. A metal oxide includes a metal. A metal is optionally Al, Si, Cr, Fe, Co, Ni, Cu, Zn, Hf, Mn, Ti, V, Zr, Ca, Mg, a lanthanides, or combinations thereof. One exemplary metal oxide is zirconium hydroxide (Zr(OH)$_4$). Zirconium hydroxide is a known nucleophile and reacts with chemicals such as explosives by displacing the nitro group(s); therefore, this material is of specific interest for explosives detection or removal, or detection or removal of other chemicals that include one or more nitro groups. Zirconium hydroxide or other metal oxides may be prepared by precipitating a metal salt, optionally zirconium salt, such as for example metal oxynitrate and metal oxychloride, in aqueous solutions using alkaline solutions such as lithium hydroxide, sodium hydroxide and potassium hydroxide. The alkaline solutions can be used to increase the pH of the solution, thereby bringing about the formation of the porous metal hydroxide via precipitation. Other bases, such as ammonium hydroxide, can also be used.

A metal oxide is optionally substantially pure. Substantially pure with respect to a metal oxide optionally means 90% pure, optionally 91% pure, optionally 92% pure, optionally 93% pure, optionally 94% pure, optionally 95% pure, optionally 96% pure, optionally 97% pure, optionally 98% pure, optionally 99% pure, optionally 99.1% pure, optionally 99.2% pure, optionally 99.3% pure, optionally 99.4% pure, optionally 99.5% pure, optionally 99.6% pure, optionally 997% pure, optionally 99.8% pure, optionally 99.9% pure, or of greater purity.

A metal oxide optionally has a porosity representing a surface area of at least 100 $m^2/g$, optionally greater than 250 $m^2/g$. In some aspects, a surface area is from 100 $m^2/g$ to 600 $m^2/g$, or any value or range therebetween, optionally 250 $m^2/g$ to 600 $m^2/g$, optionally 100 $m^2/g$ to 450 $m^2/g$, optionally 250 $m^2/g$ to 450 $m^2/g$.

Pore volume of a metal oxide is optionally at or greater than 0.1 $cm^3/g$, optionally at or greater than 0.3 $cm^3/g$. In some aspects, pore volume is 0.1 cm/g to 1.2 cm/g, or any value or range therebetween, optionally 0.3 $cm^3/g$ to 1.2 $cm^3/g$, optionally 0.1 cm/g to 0.9 $cm^3/g$, optionally 0.3 $cm^3/g$ to 0.9 $cm^3/g$.

Zirconium hydroxide, as an example, may be purchased as a commercial product from vendors that include Magnesium Electron (Flemington, N.J., USA). The structure of metal hydroxide, e.g., $Zr(OH)_4$, may be represented as a two-dimensional square lattice, each connected by a double hydroxyl bridge yielding a stoichiometric $Zr(OH)_4$. $Zr(OH)_4$ particles contain both terminal and bridging hydroxyl groups (Southern et al., *Chem. Mater.* 14 (2002) 4313; DeCoste et al., *Langmuir* 27 (2011) 9458).

Due to the porous nature of examples of MOFs, these agents are able to adsorb chemicals and in some aspects selectively adsorb chemicals. In some aspects, the reactive groups or backbone of the MOFs interact with the chemicals such as by ionic or hydrogen bonding interactions. The MOF alone or in combination with a metal oxide or oxyhydroxide (MO) may result in a material that is capable of adsorbing a chemical so that the material may be used in many different fields such as personal protection, detection of chemicals, or removal of chemicals from a surface or a fluid such as air. Interacting one or more target chemicals with such materials will result in adsorption of the toxic chemical and in some aspect produces a color change that can be used to detect the presence of a toxic chemical in the environment or on a surface.

A wide variety of chemicals may be detected, absorbed, or removed by the materials of this disclosure. In some aspects, a chemical includes one or more terminal reactive groups suitable for interacting with a MOF on a surface. A terminal reactive group is optionally a nitro, amine, halide, or other suitable reactive group. The term "terminal" as used herein means that the reactive group forms or is a portion of a chemical such that it is free to react with an MOF optionally to thereby absorb the chemical thereto. The reactive group may be at the terminus of a linear molecule, or may be intermediate at any location within the chemical.

In some aspects, a chemical encompasses chemical warfare agents (CWAs), including but not limited to toxic organophosphorus-type agents, mustard gas and derivatives, and similar such art-known toxins. Illustrative specific examples of CWAs, include but are not limited to bis-(2-chloroethyl)sulfide (HD or mustard gas), pinacolyl methylphosphonofluoridate (GD), Tabun (GA), Sarin (GB), cyclosarin (GF), and O-ethyl S-(2-diisopropylamino)ethyl methylphosphonothioate (VX), other toxic organophosphorus-type agents, their analogs or derivatives, and similar such art-known toxins. In addition, unless otherwise stated, the term "chemical" as used herein is also intended to include toxic industrial chemicals, including, but not limited to, organophosphorus-type insecticides, and the like. Mineral acids, such as for example ammonia ($NH_3$), methyl amine ($CH_3NH_2$), HCl, HF, HBr, $SO_3$, $SO_2$, $HNO_3$, $H_2S$, or combinations thereof, etc., are also exemplary toxic chemicals.

Optionally, a chemical is an explosive chemical. Many explosives have amino functionality adjacent to nitro functional groups, which serve as electron withdrawing groups. As the number of nitro groups increase, the greater the ability for the displacement with nucleophiles. Explosive chemicals as illustrated herein are optionally characterized by a laser shock velocity of 650 m/s or greater under the conditions of Gottfried, J L, *Phys. Chem. Chem. Phys.*, 2014, 16, 21452. Illustrative examples of an explosive chemical include but are not limited to: ammonium nitrate ($NH_4NO_3$), 2,4-dinitrotoluene, 2,6-dinitrotoluene, 1,3,5-trinitro-1,3,5-triazacyclohexane (1,3,5-trinitroperhydro-1,3,5-triazine; RDX); 1,3,5,7-tetranitro-1,3,5,7-tetrazocane (1,3,5,7-tetranitro-1,3,5,7-tetrazocane; HMX); 2,2-bis (hydroxymethyl)1,3-propanediol (pentaerythritol tetranitrate; PETN); 2,4,6-trinitrotoluene (2-methyl-1,3,5-trinitrobenzene; TNT), 1,2,3-trinitroxypropane (trinitroglycerin; TNG); 2,3-dimethyl-2,3,-dinitrobutane (2,3-dimethyl-2,3-dinitrobutane; DMDNB); triacetone triperoxide (TATP); hexamethylene triperoxide diamine (HMTD); other peroxide or nitrate based explosive materials; gunpowder(s); pentaerythritol (2,2-Bis(hydroxymethyl)1,3-propanediol; PE); military or commercial grades of C4; Semtex A1; Semtex H; 2,4-dinitroanisole (DNAN), 1,3-Dinitrobenzene (1,3-DNB); 1,3,5-trinitrobenzene (1,3,5-TNB); hexanitrostilbene (HNS); croconic acid; pentolite; 2,4,6-triamino-1,3,5-trinitrobenzene (TATB); comp B; nitrotriazalone (NTO); hexanitrohexaazaisowurtzitane (CL-20); 1,1-diamino-2,2-dinitroethene (DADNE; FOX-7); or combinations thereof.

As such processes are provided for the detection or removal of a chemical from a surface or in a fluid such as air. A composite material as provided herein is contacted with a sample that may or may not contain one or more chemicals. A sample may be a liquid, solid, or gas. Contacting is optionally by any suitable method such as immersion, incubation, coating, rubbing, blowing, or other method by which a chemical may come into contact with a material. A sample is optionally a liquid sample. A sample is optionally a gaseous sample. A sample is optionally located on a solid surface that may be coatable with a material as provided herein. A material, optionally in the form of a pellet, powder, film, or present on a surface is optionally contacted to a sample for a suitable contact time. Following the contact time, or during the contact time, material is removed from the surface, and optionally examined for the presence or absence of a chemical in or on the sample.

As an illustrative example, a material in the form of a film may be coated (e.g., by spraying, layering, contacting, or other suitable method) onto a solid sample and allowed to remain in contact with the surface for a contact time. During the contact time the chemical may be adsorbed and optionally reacted with the MOF and the optional MO so as to associate the chemical with the material, and optionally convert the chemical into another, less dangerous or toxic form. The material may then be removed such as by peeling, chipping, dissolving in an appropriate solvent, or other suitable method so thereby remove the chemical from the surface.

A contact time is appreciated as any time suitable to allow adsorption of a chemical into a material. A contact time is optionally from 1 second to 1 week or any value or range therebetween. Optionally, a contact time is permanent such that the material is never removed from the surface but simply acts to prevent further spread or transfer of the chemical to another surface permanently or until the surface and material are destroyed. Optionally, a contact time is 1 second to 48 hours, optionally 1 min to 48 hours, optionally 1 min to 24 hours, optionally 1 hour to 12 hours, optionally 1 min to 12 hours.

In another example, a material may be immersed or contacted in a fluid (e.g., liquid or gas, optionally air) sample that includes one or more chemicals therein. After a suitable contact time, optionally 1 minute to 48 hours, the liquid may be evaporated or otherwise removed, or contact is otherwise ceased. The composite material may then be examined by one or more processes.

Optionally, a chemical is detected by a colorimetric change in the material that may be readily measured, optionally by obtaining a post-exposure colorimetric state of the material; determining a difference between the post-exposure colorimetric state and a pre-exposure colorimetric state or control; and sensing the chemical by the presence of a difference between the post-exposure colorimetric state and the pre-exposure colorimetric state or control. This color change is thus an indication that a toxic chemical is present, and therefore acts as a sensor.

For solid or fluid detection of the presence or absence of a chemical, a process optionally detects a colorimetric or other measureable change in the material. Optionally, a colorimetric state is determined using by spectrometer, optionally a Fourier transform infrared (FTIR) spectrometer, to determine colorimetric state of the sorbent at one or multiple wavelengths or ranges of wavelengths. Illustrative examples of such spectroscopic techniques can be found in Peterson, et al., *Industrial & Engineering Chemistry Research*, 2013; 53:701-707. Other illustrative methods for measuring or determining the presence or absence of a difference in colorimetric state include UV/Vis spectrometry, photoluminescence, luminescence, and fluorescence. Optionally a colorimetric change is detected by visual inspection.

The provided processes are uniquely suited to field ready systems for the detection of one or more chemical agents of interest, for personal protection of a material such a substrate or an organism (optionally a human), for measuring lifetime of protective equipment, for destruction or sequestration of one or more chemicals or other process.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXPERIMENTAL

Example 1: Synthesis of UIO-66-NH$_2$

UiO-66-NH$_2$ was synthesized by TDA Research Inc. Optionally, a solvothermal synthesis of the MOF UiO-66-NH$_2$ was performed using zirconium tetrachloride, 2-aminoterephthalic acid, water and dimethylformamide. The metal salt was purchased from Alfa Aesar. Additional chemicals were purchased from Sigma Aldrich. The molar composition of the reaction is 1 Zr$^{4+}$: 1 2-ATA: 3.17H$_2$O: 297 DMF.

400 mL of DMF and 2 mL of DI 20 were added slowly to 8.12 g of ZnCl$_4$ in an Erlenmeyer flask (gases are produced upon addition of solvent). In a separate Erlenmeyer flask 400 mL of DMF was added to 6.275 g of 2-aminoterephthalic acid. Both mixtures were stirred until completely dissolved. The solutions were then mixed together and heated by microwave irradiation in sealed vessels at 1500 W for 9 hr at 120° C. The resulting pale yellow powder was filtered and extracted with methanol in a Soxhlet extractor, after which the material was dried in air and then heated in an oven at 65° C. The material was subsequently activated in vacuum at 150° C. for 16 hours.

Example 2: Forming a Composite Material Including an MOF

A composite material is synthesized by combining the block copolymer PS-b-PI-b-PS (BCP) (Aldrich) to 20% by weight in tetrahydrofuran (THF). The MOF, UiO-66-NH$_2$ of Example 1, HKUST-1 (NuMat Technologies), PCN-250 (NuMat Technologies), or ZIF-8 (Sigma-Aldrich) are individually combined with the THF at weight percents of 10, 25, or 50. Alternatively, the MOF is dissolved in the THF prior to addition of the BCP. The resulting mixture is cast onto a Teflon sheet, a Pyrex dish or simply drop cast, and used for subsequent studies.

Example 3: Characterization of Composite Materials

The composite materials of Example 2 are subjected to both physical and functional analyses. Each MOF can range from 1-99% by weight of the final composite, which alters the end composite properties. For example, materials with low weight percent MOFs (e.g., 1-50%) show similar stretchable properties to the base polymer. As weight percent increases, the materials gets more difficult to stretch, and, at a certain weight percent, a film is no longer formed, but rather discrete particles. In this latter case, the polymer acts as a binder rather than as a film.

SEM

Figure 2:
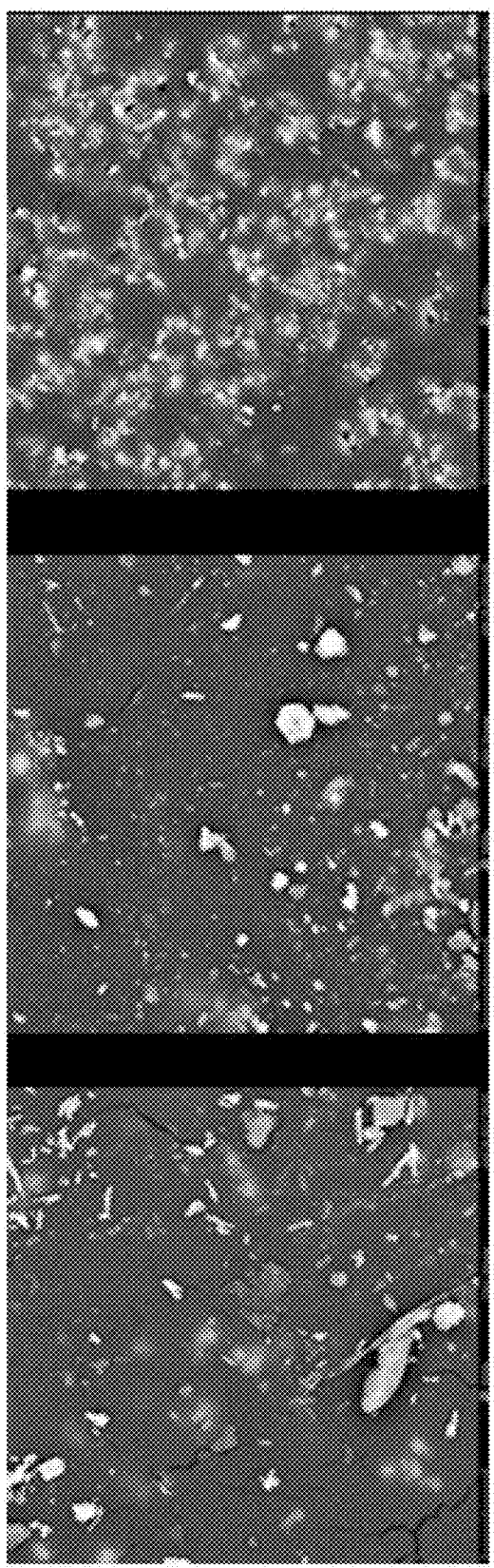
FIG. 2 presents SEM images of HKUST-1, (A), PCN-250 (B), and ZIF-8 (C) with BCP at 10 weight percent illustrating compatibility between the BCP and each MOF.
Figure 3:
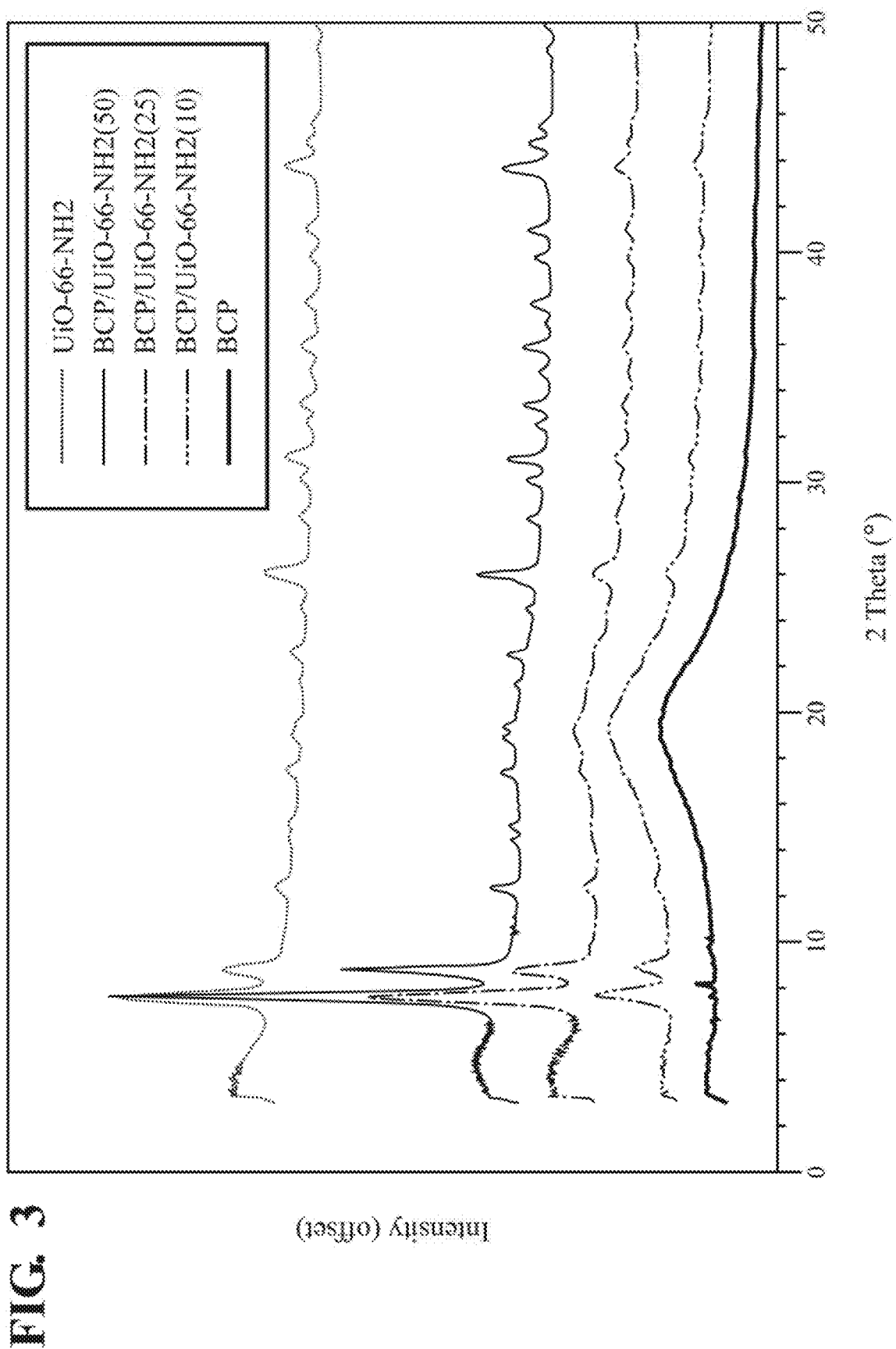
FIG. 3 illustrates PXRD spectra of UiO-66-$NH_2$ with BCP at various weight percentages of the MOF.
Figure 4:
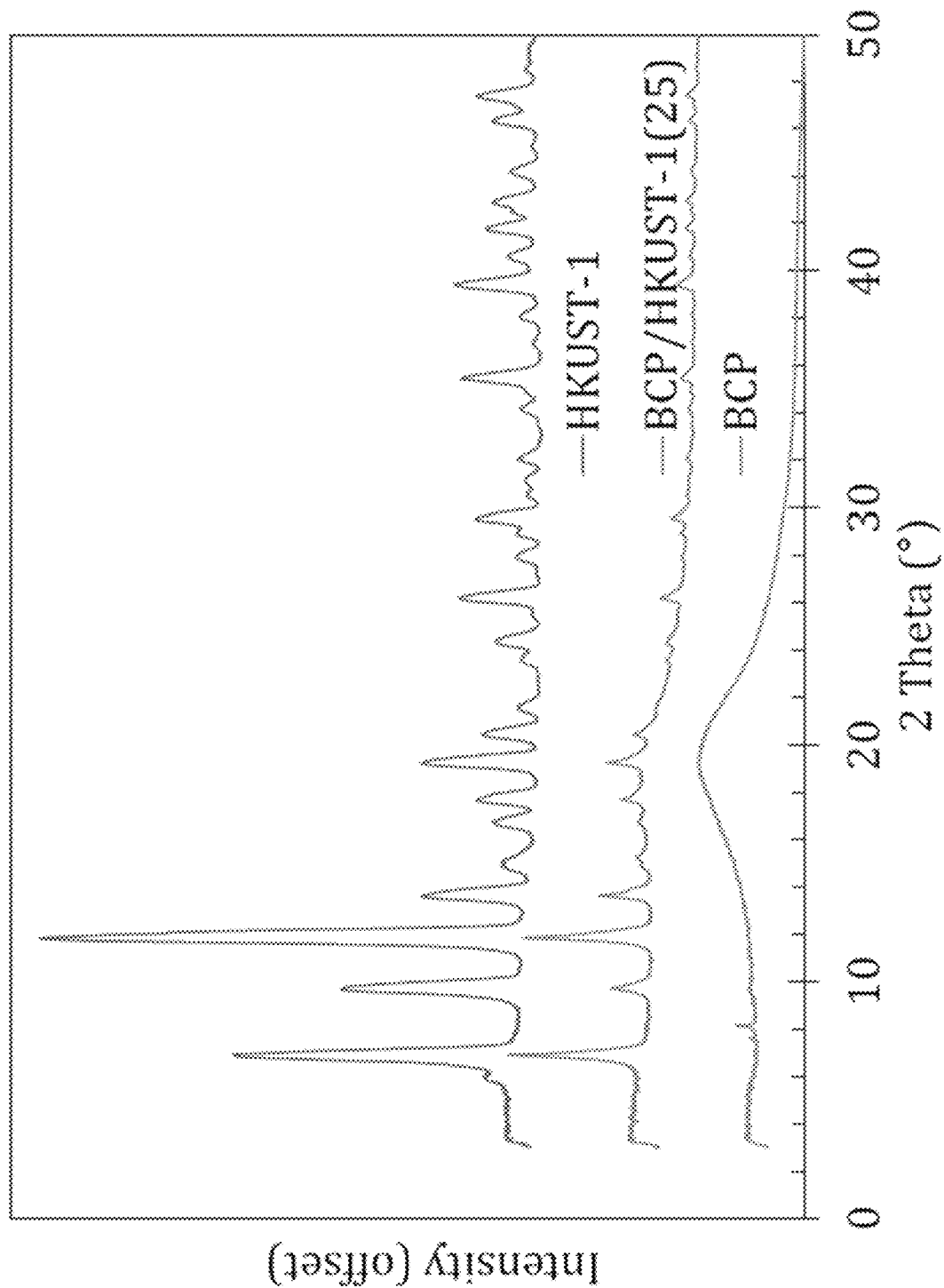
FIG. 4 illustrates PXRD spectra of HKUST-1 with BCP at 25 weight percentage of the MOF.
Figure 5:
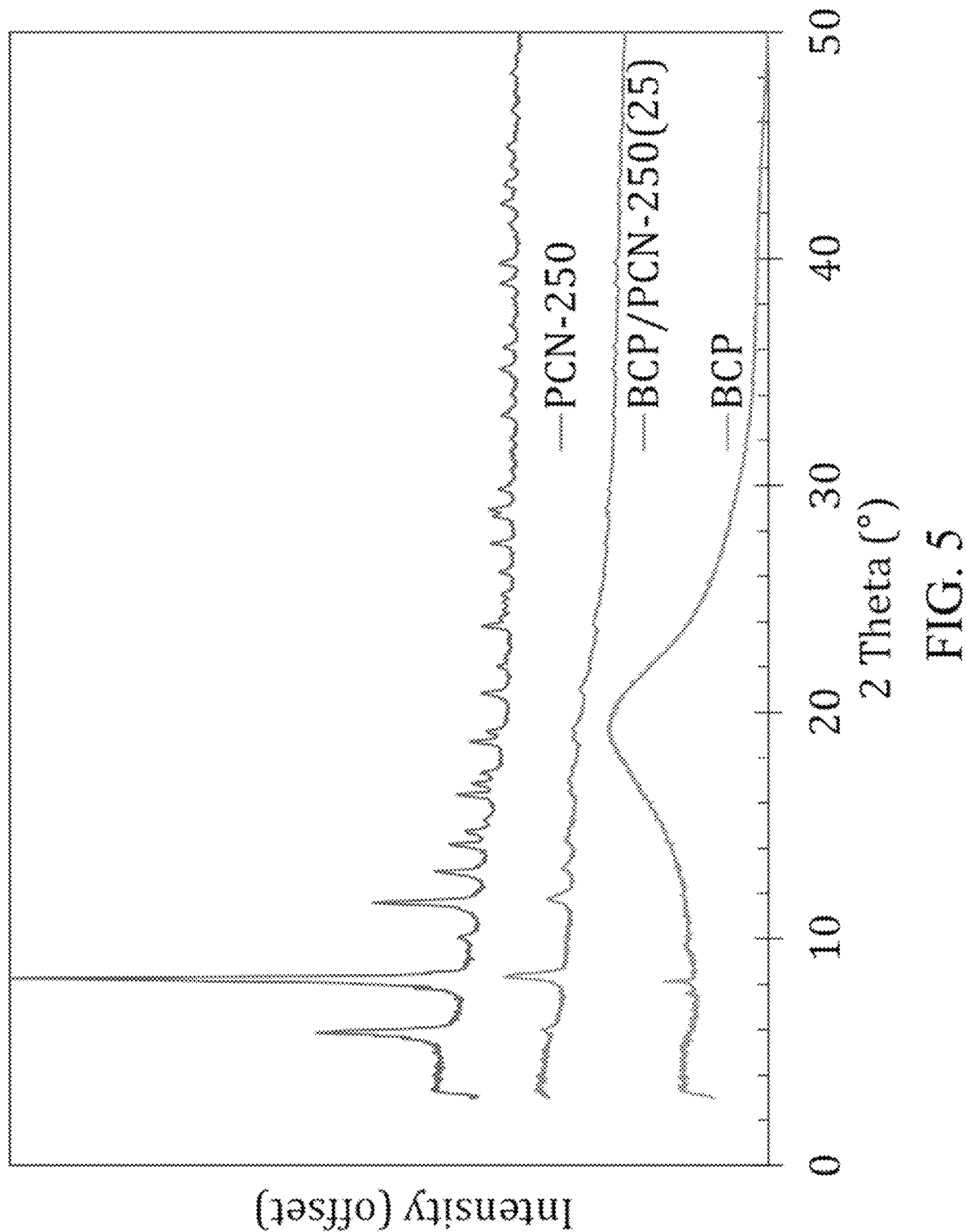
FIG. 5 illustrates PXRD spectra of PCN-250 with BCP at 25 weight percentage of the MOF.
Figure 6:
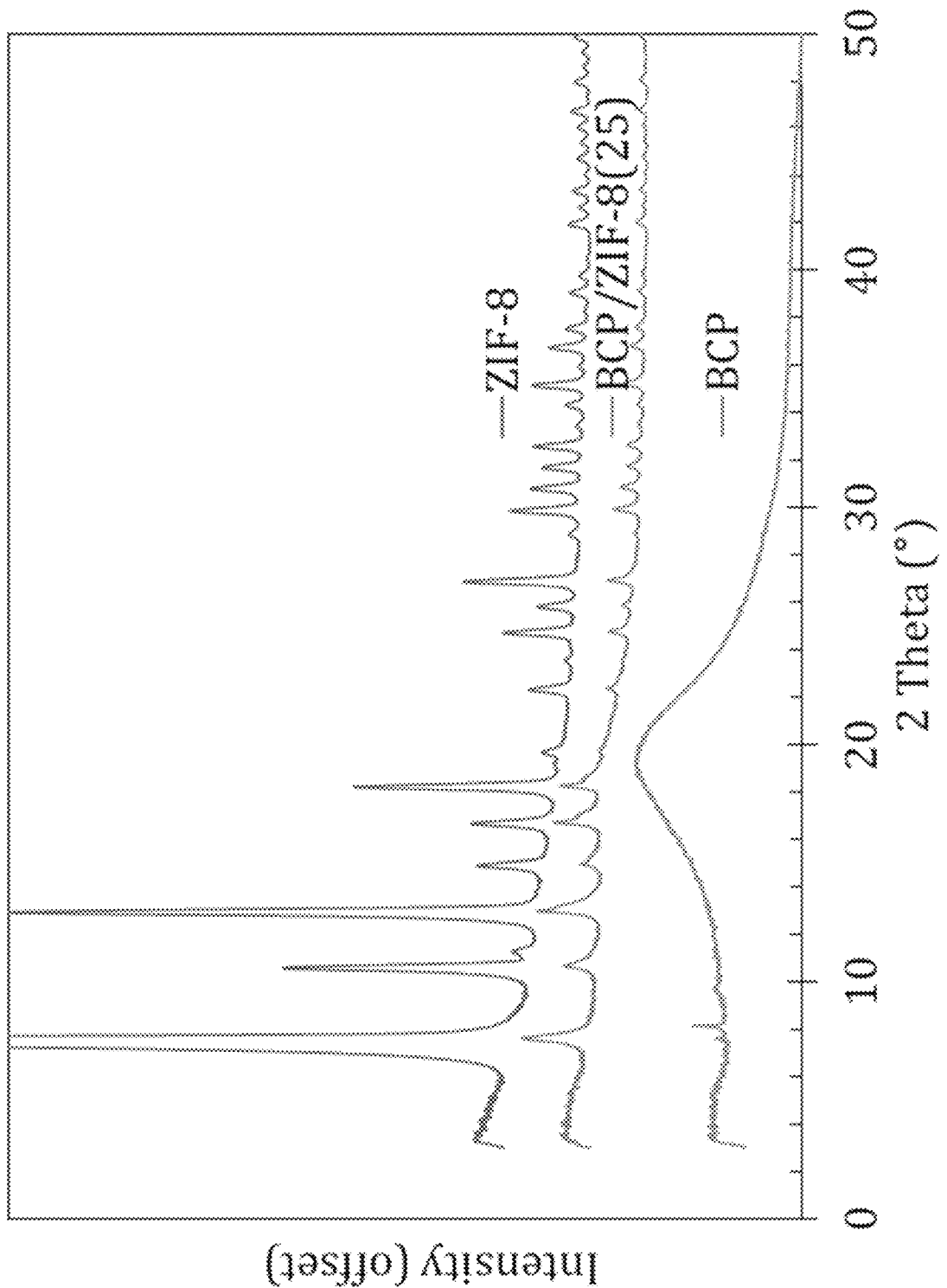
FIG. 6 illustrates PXRD spectra of ZIF-8 with BCP at 25 weight percentage of the MOF.
Figure 7:
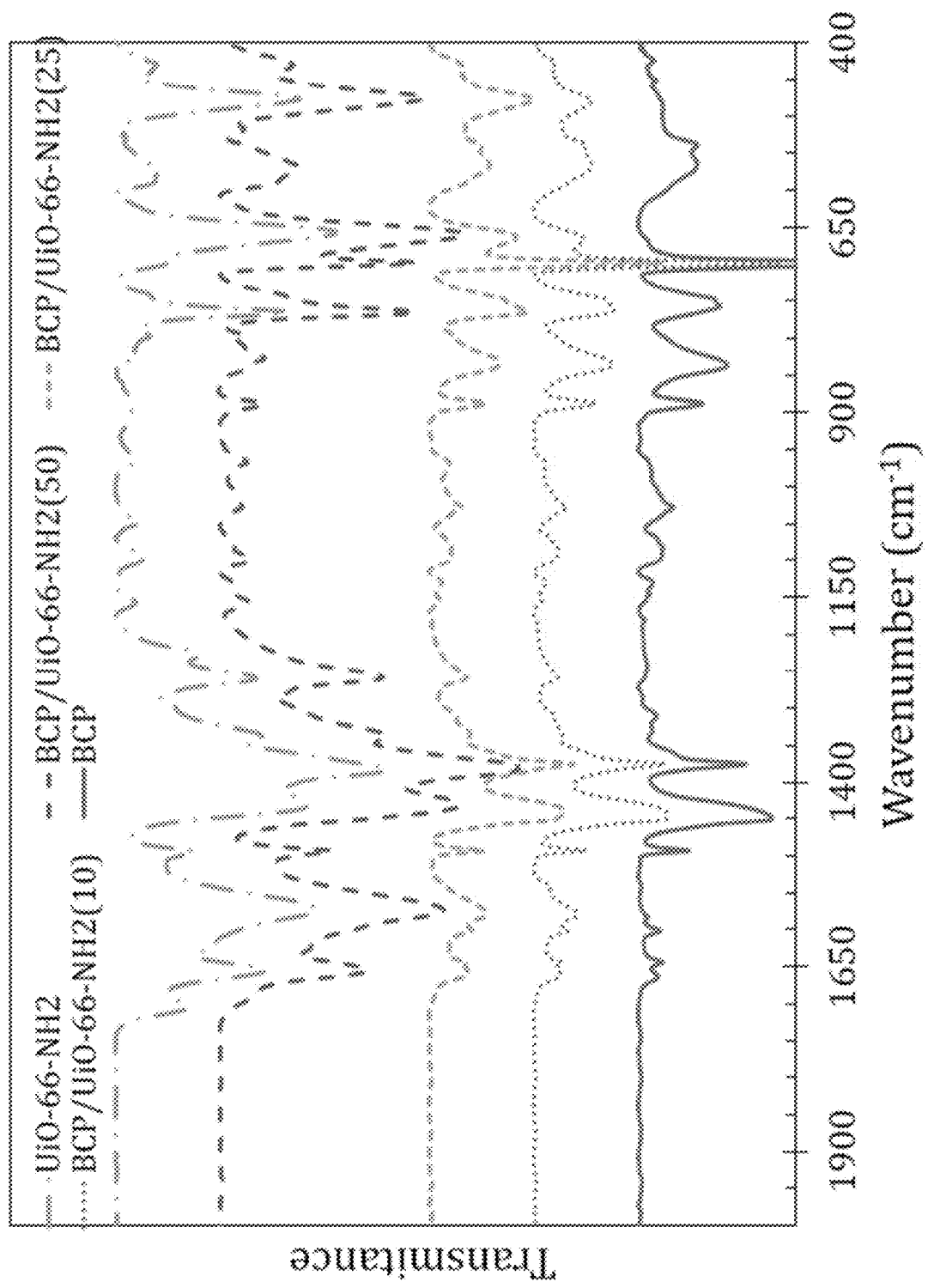
FIG. 7 illustrates ATR-FTIR spectra of UiO-66-$NH_2$ with BCP at various weight percentages of the MOF.
Figure 8:
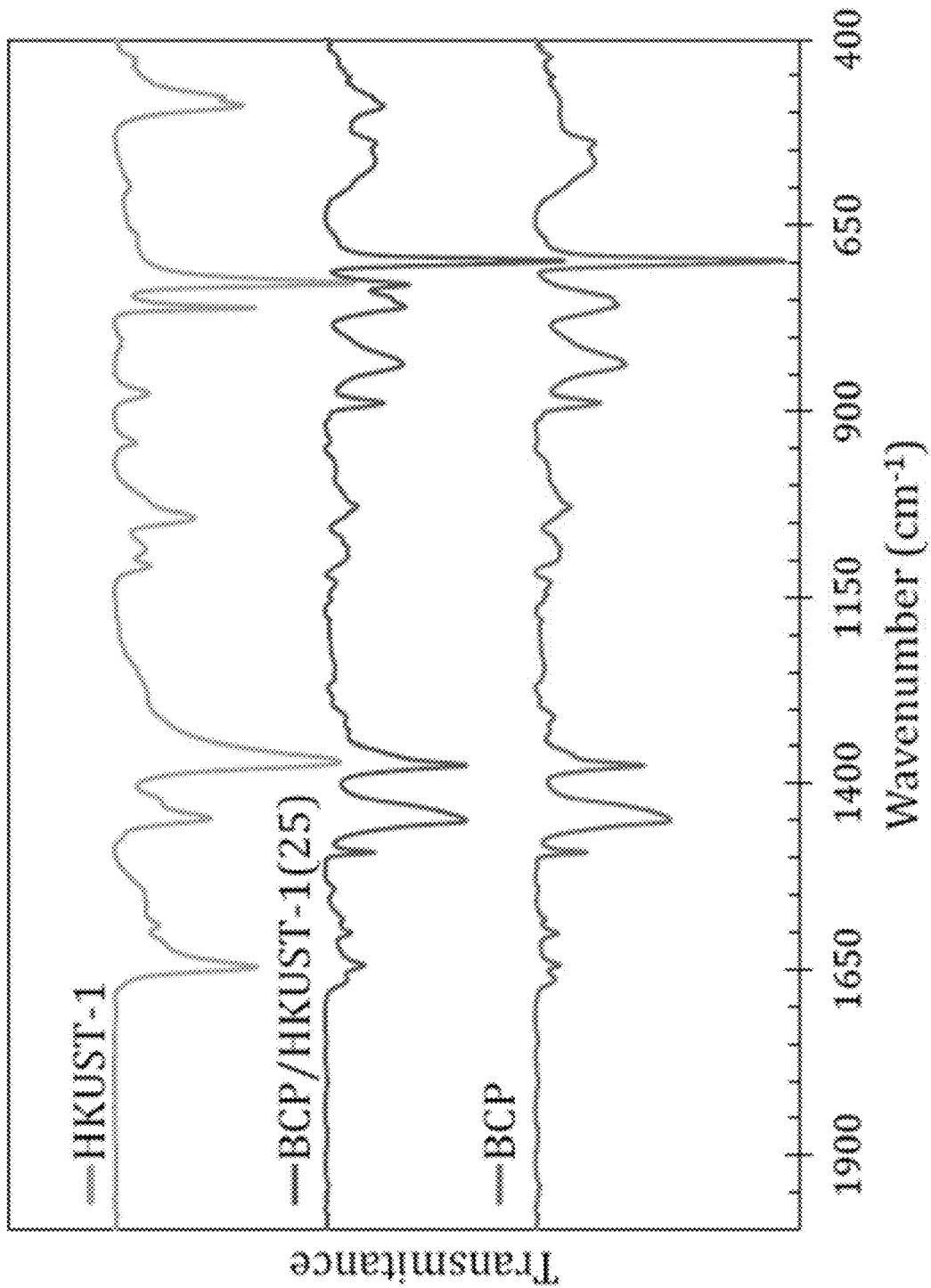
FIG. 8 illustrates ATR-FTIR spectra of HKUST-1 with BCP at 25 weight percentage of the MOF.
Figure 9:
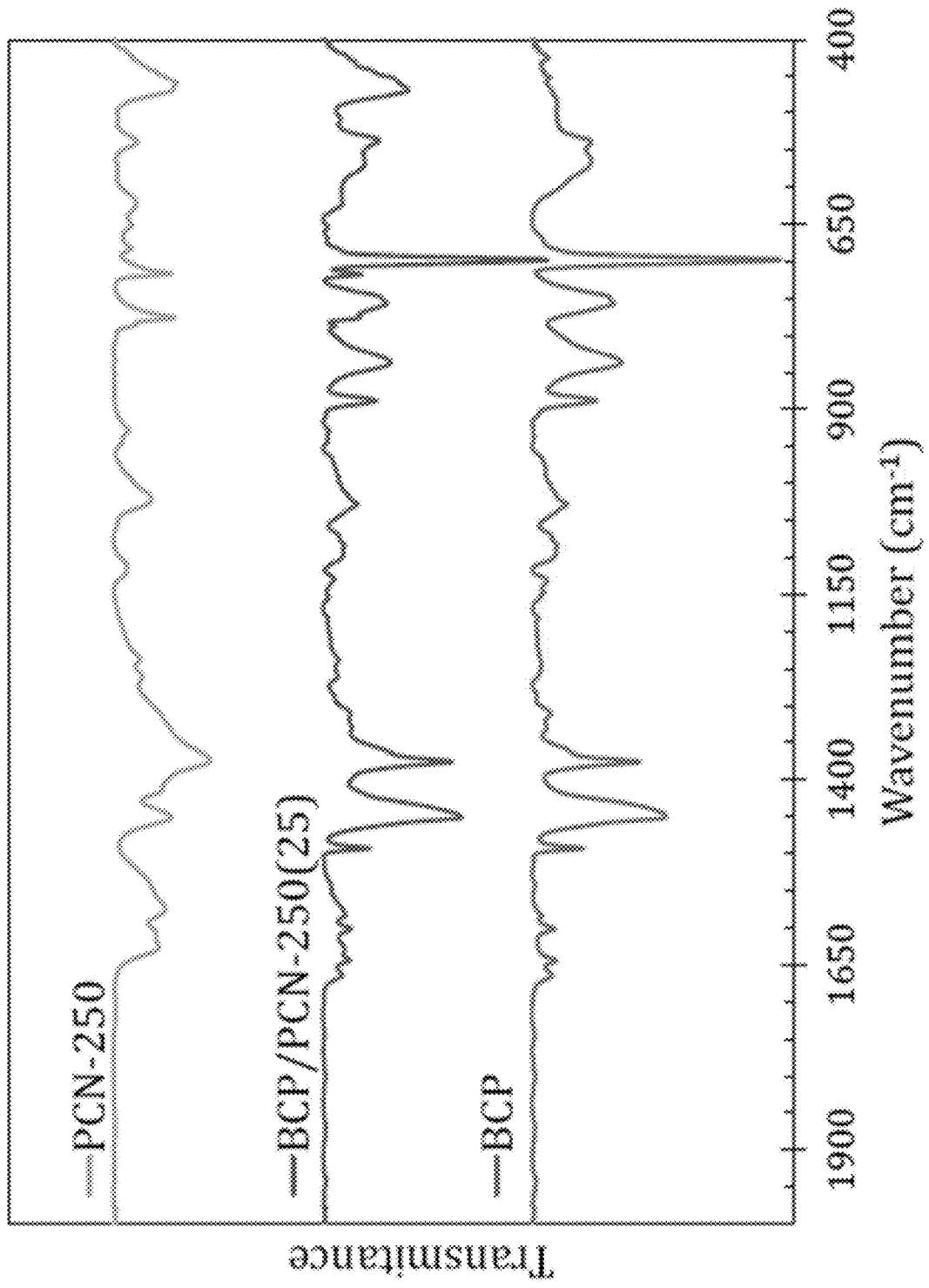
FIG. 9 illustrates ATR-FTIR spectra of PCN-250 with BCP at 25 weight percentage of the MOF.
Figure 10:
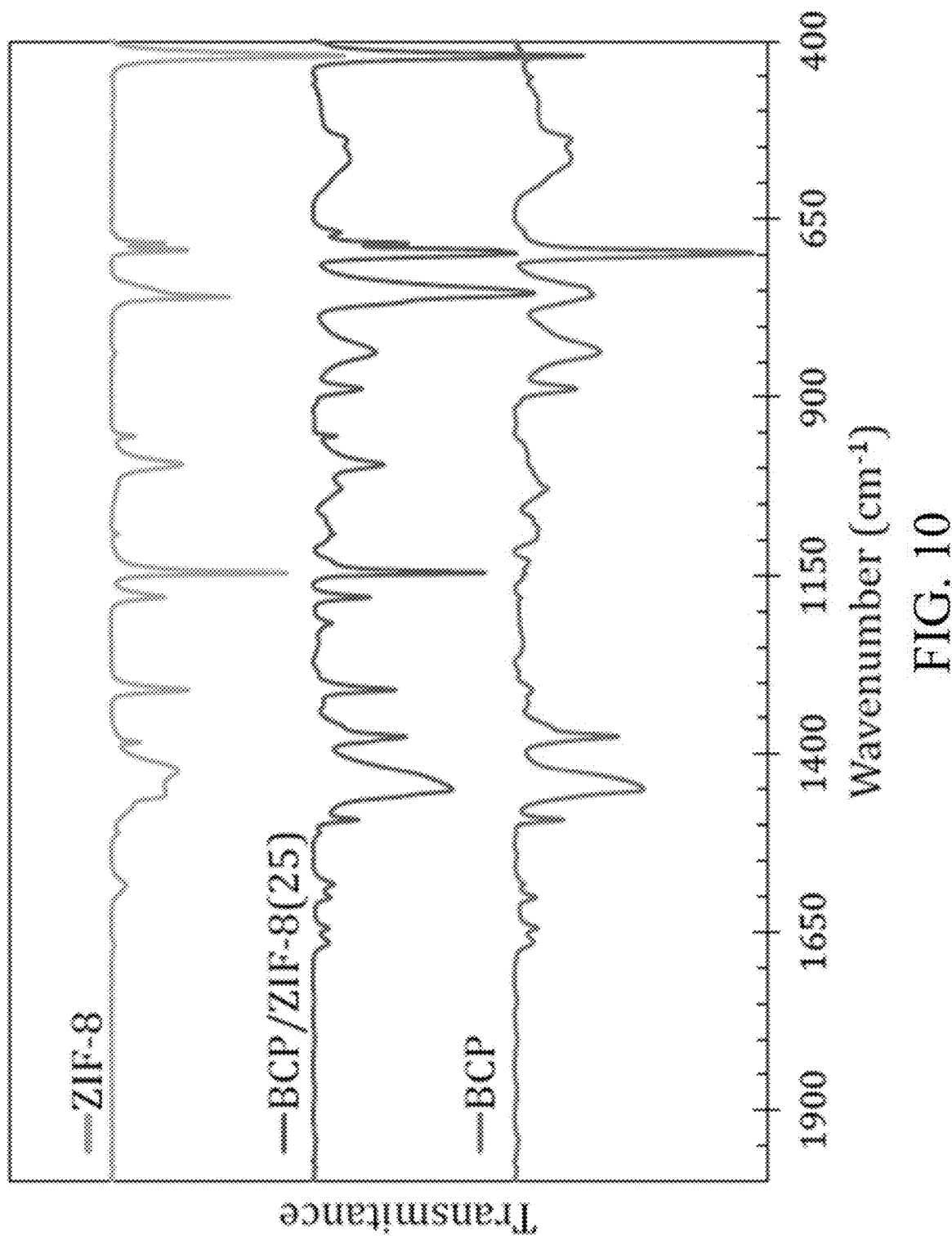
FIG. 10 illustrates ATR-FTIR spectra of ZIF-8 with BCP at 25 weight percentage of the MOE.

Scanning electron microscopy (SEM) images were taken of each sample using a Phenom GSR desktop Scanning Electron Microscope. Samples were supported on double-sided carbon tape and sputter coated with gold prior to analysis. Each of the tested MOFs is compatible with the BCP. As more MOF is added, more MOF is exposed at the surface, which is more available for reaction with a chemical. However, even at lower loadings, the MOF in the film is available for reaction. FIGS. 1 and 2 present SEM images of MOF/block copolymer composites.

PXRD

Each sample was analyzed using powder X-ray diffraction (PXRD). PXRD measurements were taken using a Rigaku Miniflex 600 X-ray powder diffractometer with a D/Tex detector. Samples were scanned at 40 kV and 15 mA, using Cu Kα radiation (λ=1.54 Å) at a scan rate of 2° min$^{-1}$ over a 2θ range of 3 to 60°. Zero-background discs were used for XRD measurements. A background correction was performed in the Rigaku PDXL software (version 2.1.3.6). As illustrated in FIGS. 3-6, the crystallinity of each MOF is preserved in the BCP.

Attenuated Total Reflectance-Fourier Transform Infrared (ATR-FTIR) Spectroscopy

ATR-FTIR spectra were recorded on a Bruker Tensor 27 spectrometer from 4000-400 cm$^{-1}$ at a resolution of 2 cm$^{-1}$. FIGS. 7-10 illustrate ATR-FTIR spectra of MOF/block copolymer composites.

Hydrolysis of Methyl Paraoxon Kinetics

The reaction with methyl paraoxon was performed in accordance by art recognized procedures. Briefly, in a 4 mL vial 5.6 mg of MOF powder or 12 mg of MOFabric (MOF/fiber composite material) sample was added to 1 mL of 0.45 M N-ethylmorpholine buffer. The solution was stirred for 30 minutes at room temperature. Methyl paraoxon (4 μL, 0.025 mmol) was added and the reaction was stirred. Aliquots (10 μL) were removed every 5 minutes for 1 h, added to a 5 mL volumetric flask, and diluted to the mark with 0.45 M N-ethylmorpholine. The UV-vis spectra of the diluted samples were recorded on a JASCO V-650 spectrophotometer, and the growth of the product peak at 407 nm was monitored and used for quantification.

Figure 11:
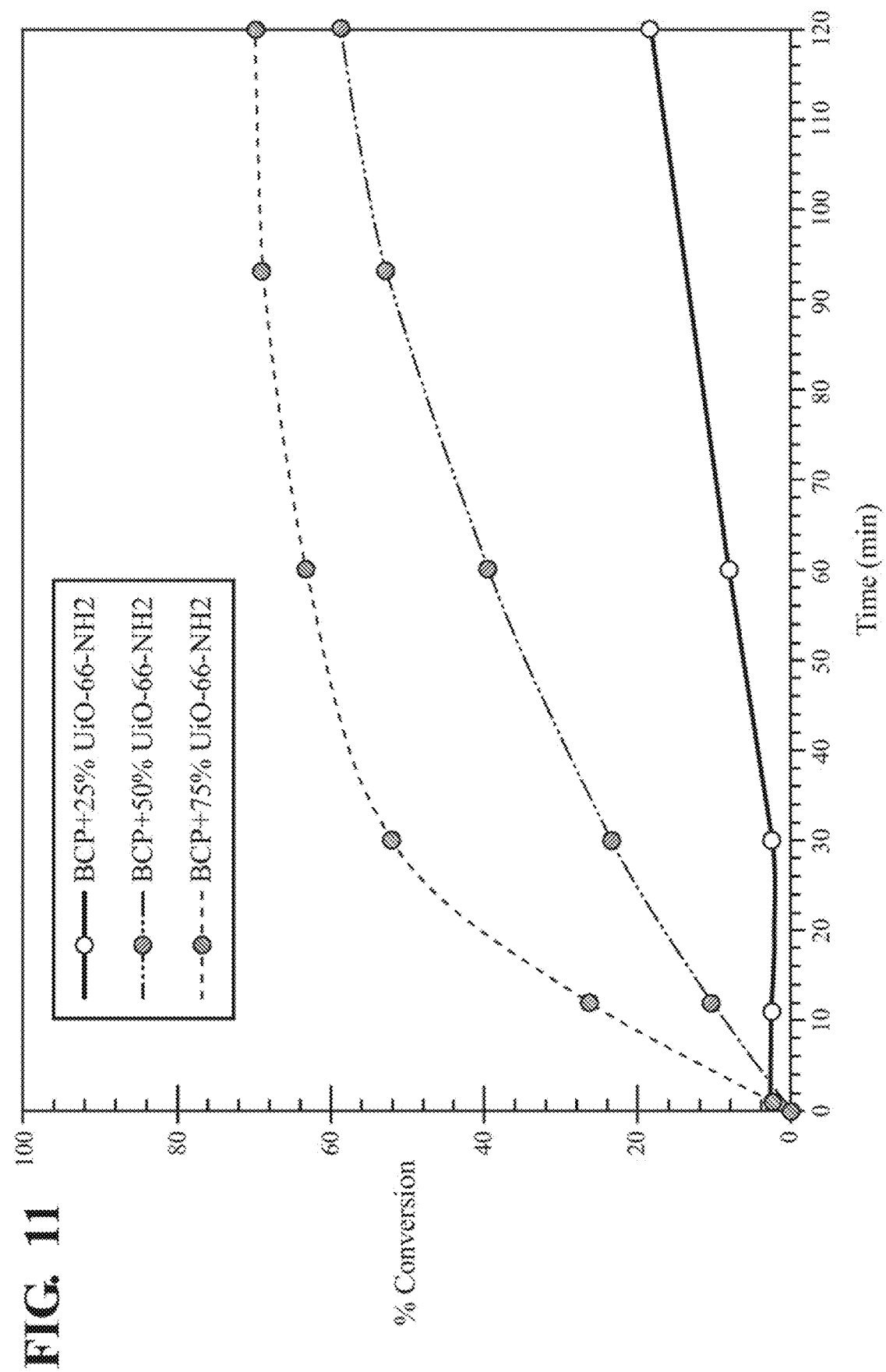

FIG. 11 shows methyl paraoxon hydrolysis data in an N-ethylmorpholine buffered aqueous solution with the active MOF. The data indicate that the MOF deposited in the films is active towards degradation, thus proving the concept that the composites can be useful for degrading nerve (and other) agents in a variety of end items, including personal protective equipment, barriers, and others.

CEES Permeation

Figure 12:
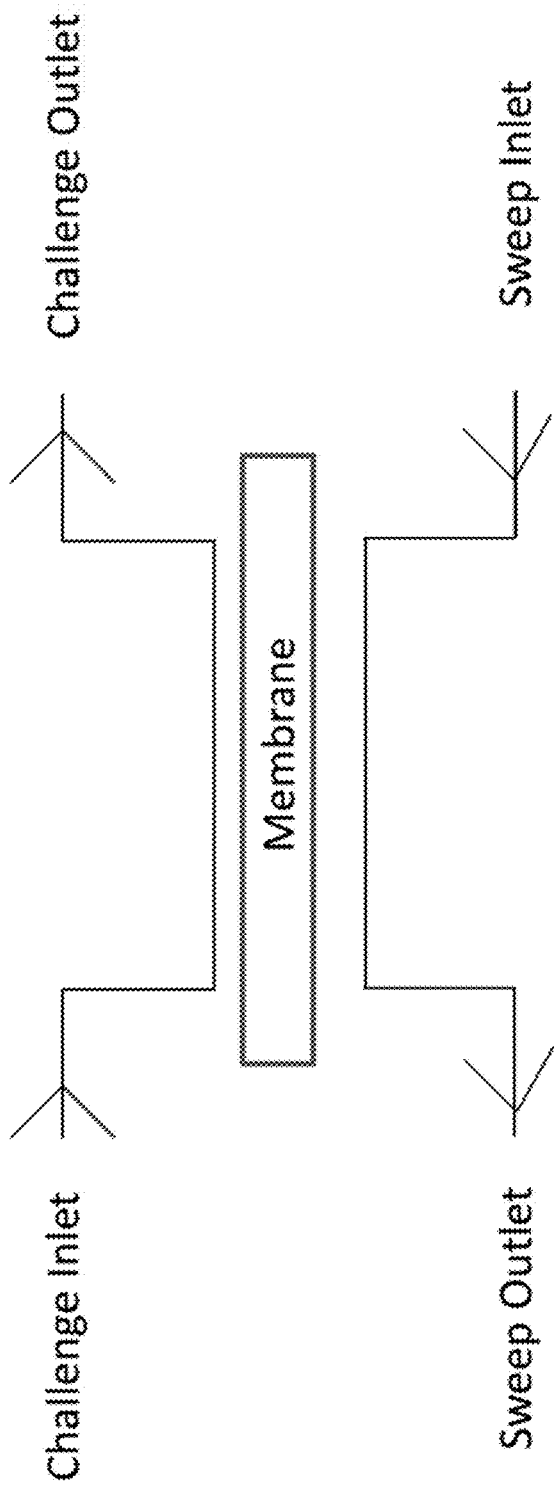
FIG. 12 illustrates a schematic of a test apparatus for analyses of 2-CEES permeation.

A 1 inch diameter permeation cell was purchased from Pesce Labs. A schematic of a test apparatus is illustrated in FIG. 12. The inlet air stream carries a 2-CEES challenge concentration of 300 mg/m$^3$ and sweeps across the membrane and exits at the challenge outlet stream. A dry air sweep stream sweeps across the permeant side of the membrane and exits at the permeant outlet stream. Concentration of 2-CEES is monitored by gas chromatography at the challenge inlet, outlet, and permeant outlet.

Figure 13:
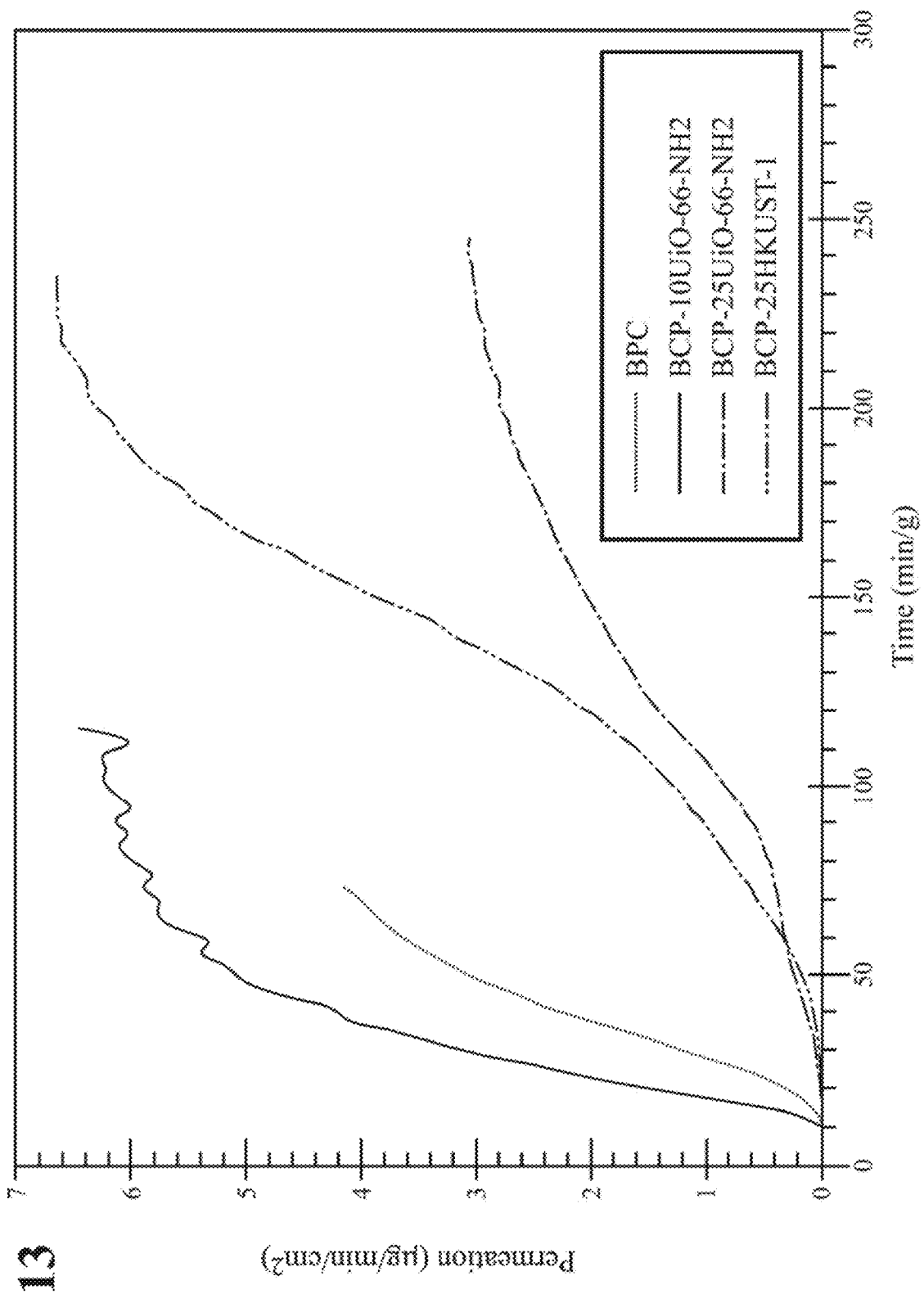
FIG. 13 illustrates CEES permeation of UiO-66-NH$_2$/BCP composite materials at various concentrations of the MOF.

FIG. 13 shows permeation data for 2-chloroethyl ethylsulfide (2-CEES, aka CEES). The three samples shown have 10% UiO-66-NH$_2$, 25% UiO-66-NH$_2$, and 25% HKUST-1 MOFs by weight compared to the block copolymer. Data illustrate that adding the MOF significantly enhances protection against CEES, particularly for the 25 wt % samples.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

We claim:

1. A composite material, comprising:
   a polymeric material comprising a block copolymer, wherein the block copolymer is comprised of:

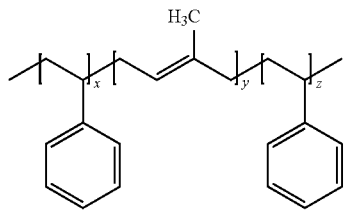

where x is polystyrene, y is polyisoprene, and z is polystyrene and wherein a unit value of y is twice or more the unit value of x and z alone or combined; and
   a metal organic framework intermixed within said polymeric material.

2. The material of claim 1, wherein the polymeric material comprises a prepolymerized block copolymer.

3. The material of claim 1, wherein the unit value of y is three times or more the unit value of x and z alone or combined.

4. The material of claim 1, wherein the metal organic framework is present at 5 weight percent to 35 weight percent of said composite material.

5. The material of claim 1, wherein the metal organic framework is present at 5 weight percent to 20 weight percent of said composite material.

6. The material claim 1, wherein the metal organic framework comprises at least one pendant group in the framework, the pendant group comprising an amine, nitro, or halide.

7. The material of claim 1, wherein the metal organic framework is a UiO, IRMOF, MIL, or PCN.

8. The material of claim 1, wherein the metal organic framework includes Zr.

9. The material of claim 8, wherein the metal organic framework is selected from the group consisting of UiO-66-NH$_2$, UiO-66, UiO-67, NU-1000, MOF-545, and combinations thereof.

10. The material of claim 1, wherein the metal organic framework is selected from the group consisting of: HKUST-1, PCN-250, ZIF-8, and combinations thereof.

11. The material of claim 1, wherein the metal organic framework is selected from the group consisting of Zn$_2$(bpdc)$_2$(bpee), MIL-53-NH$_2$, MIL-125-NH$_2$, ZIF-8, MOF-74 (M-DOBDC), and PCN-222.

12. The material of claim 1, further comprising a second reactive compound, the second reactive compound comprising a metal oxide, zeolite, or a metal nanoparticle.

13. The material of claim 12, wherein the second reactive compound comprises a metal oxide.

14. The material of claim 12, wherein the metal oxide includes a transition metal or cation.

15. The material of claim 12, wherein the metal oxide comprises a metal selected from the group consisting of: Al; Si, Cr; Fe; Co; Ni; Cu; Zn; Hf; Mn; Ti; V; Zr; Ca; Mg; and lanthanide.

16. A process for removing a chemical from a surface, comprising:
    contacting the composite material of claim 1 with a surface for a contact time; and removing the composite material from the surface to thereby remove the chemical from the surface.

17. The process of claim 16, wherein the block copolymer is comprised of $$\left[\!\!\begin{array}{c}\\ \end{array}\!\!\right]_x\!\!-\!\!CH_2\!-\!\!C(CH_3)\!\!=\!\!CH\!\!-\!\!CH_2\!\!-\!\!\left[\!\!\begin{array}{c}\\ \end{array}\!\!\right]_y\!\!-\!\!\left[\!\!\begin{array}{c}Ph\\ \end{array}\!\!\right]_z$$

where a unit value of x plus z is less than three times a unit value of y;
the metal organic framework is present at 80 weight percent or less; and
the metal organic framework is selected from the group consisting of UiO-66-NH$_2$, UiO-66, UiO-67, NU-1000, MOF-545, HKUST-1, PCN-250, ZIF-8, and combinations thereof.

18. The process of claim 16, wherein the chemical is a toxic chemical that comprises 2-chloroethyl ethyl sulfide, ammonia, ammonia nitrate, an organophosphate, cyclotrimethylenetrinitramine, pentaerythritol tetranitrate, octogen trinitrotoluene, 2,4-dinitrotoluene, 2,6-dinitrotoluene; arsine, chlorine, cyanogen chloride, hydrogen chloride, hydrogen cyanide, hydrogen sulfide, methyl bromide, nitrogen dioxide, phosgene, sulfur dioxide, bis-(2-chloroethyl) sulfide (HD or mustard gas), pinacolyl methylphosphonofluoridate (GD), Tabun (GA), Sarin (GB), cyclosarin (GF), O-ethyl S-(2-diisopropylamino)ethyl methylphosphonothioate (VX) or other V-type nerve agents.

19. A process of detecting the presence or absence of a toxic chemical, comprising,
contacting a sample containing a toxic chemical with the composite material of claim 1 for a detection time; and
detecting the presence or absence of a toxic chemical in the sample by a colorimetric change in the material.

20. A process of preventing contact of a toxic or hazardous chemical to a substrate, an object, or an organism comprising:
coating, optionally directly coating, a substrate, an object, an organism, or a portion thereof with the material of claim 1 so that the composite material prevents transmission of the toxic chemical to the substrate, the object, or the organism.

21. The process of claim 20, wherein said organism is a human.

22. The process of claim 20, wherein said block copolymer is about 22 weight percent polystyrene.

23. The process of claim 20, wherein the metal organic framework is present at 5 weight percent to 35 weight percent of said composite material.

24. The process of claim 20, wherein the metal organic framework is a UiO, IRMOF, MIL, or PCN.

25. The process of claim 20, wherein the metal organic framework includes Zr.

26. The process of claim 25, wherein the metal organic framework is selected from the group consisting of UiO-66-NH$_2$, UiO-66, UiO-67, NU-1000, MOF-545, and combinations thereof.

27. The process of claim 20, wherein the metal organic framework is selected from the group consisting of: HKUST-1, PCN-250, ZIF-8, and combinations thereof.

28. The process of claim 20, wherein the metal organic framework is selected from the group consisting of Zn$_2$(bpdc)$_2$(bpee), MIL-53-NH$_2$, MIL-125-NH$_2$, ZIF-8, MOF-74 (M-DOBDC), and PCN-222.

29. The process of claim 20, wherein the toxic chemical is selected from the group consisting of 2-chloroethyl ethyl sulfide, ammonia, ammonia nitrate, an organophosphate, cyclotrimethylenetrinitramine, pentaerythritol tetranitrate, octogen trinitrotoluene, 2,4-dinitrotoluene, 2,6-dinitrotoluene; arsine, chlorine, cyanogen chloride, hydrogen chloride, hydrogen cyanide, hydrogen sulfide, methyl bromide, nitrogen dioxide, phosgene, sulfur dioxide, bis-(2-chloroethyl) sulfide (HD or mustard gas), pinacolyl methylphosphonofluoridate (GD), Tabun (GA), Sarin (GB), cyclosarin (GF), O-ethyl S-(2-diisopropylamino)ethyl methylphosphonothioate (VX) or other V-type nerve agents.

30. The material of claim 1, wherein x, y, and z are selected to yield about 22 weight percent polystyrene.

* * * * *